United States Patent
Yoshimura

(10) Patent No.: US 7,520,488 B2
(45) Date of Patent: Apr. 21, 2009

(54) POPPET-TYPE TWO-PORT SOLENOID VALVE

(75) Inventor: Shinichi Yoshimura, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 354 days.

(21) Appl. No.: 11/408,015

(22) Filed: Apr. 21, 2006

(65) Prior Publication Data

US 2006/0266968 A1    Nov. 30, 2006

(30) Foreign Application Priority Data

May 26, 2005    (JP) ............................. 2005-154347

(51) Int. Cl.
*F16K 31/02*    (2006.01)
(52) U.S. Cl. ................... 251/129.16; 335/279; 335/281
(58) Field of Classification Search ............ 251/129.16, 251/175; 335/279, 281
See application file for complete search history.

(56) References Cited

U.S. PATENT DOCUMENTS

| | | | |
|---|---|---|---|
| 2,370,752 A * | 3/1945 | Ray ............................ 335/281 |
| 2,911,183 A * | 11/1959 | Matthews et al. ....... 251/129.16 |
| 3,133,234 A | 5/1964 | Dietz |
| 5,232,196 A * | 8/1993 | Hutchings et al. ...... 251/129.15 |
| 6,105,931 A * | 8/2000 | Frank et al. ............. 251/129.15 |
| 6,339,366 B1 * | 1/2002 | Meisiek ..................... 335/281 |
| 6,415,817 B1 * | 7/2002 | Krimmer et al. ........ 251/129.16 |
| 6,542,059 B2 * | 4/2003 | Sato et al. ................... 335/279 |
| 6,631,883 B1 * | 10/2003 | Van Den Brink ....... 251/129.16 |
| 6,814,103 B2 | 11/2004 | Neuhaus et al. |
| 2004/0222397 A1 * | 11/2004 | Hayashi .................. 251/129.09 |
| 2005/0253104 A1 * | 11/2005 | Sato et al. ............... 251/129.19 |
| 2005/0269539 A1 * | 12/2005 | Schulz et al. ........... 251/129.22 |

FOREIGN PATENT DOCUMENTS

| | | |
|---|---|---|
| DE | 100 37 793 A1 | 2/2002 |
| DE | 102 15 592 C1 | 5/2003 |
| JP | 2004-332876 | 11/2004 |

* cited by examiner

*Primary Examiner*—John Bastianelli
(74) *Attorney, Agent, or Firm*—Oblon, Spivak, McClelland, Maier & Neustadt, P.C.

(57) ABSTRACT

A two-port solenoid valve, which opens and closes a valve seat by operating a tabular valve member by using electromagnetic force and fluid pressure, capable of improving the responsiveness when the valve member closes the valve seat by the action of the fluid pressure is provided. The slender tabular valve member is disposed inside a valve chamber to which an elongate output orifice and an input orifice are open, and opens and closes the valve seat disposed around the output orifice in the same manner as a poppet valve. The valve seat is opened by attracting the valve member by the action of electromagnetic force applied to a rectangular fixed core, and is closed by the action of pressurized fluid flowing from the input orifice. In this two-port solenoid valve, a fluid chamber for introducing the pressurized fluid flowing from the input orifice and applying the fluid pressure to the valve member is formed in a slender rectangular pole face of the fixed core.

8 Claims, 6 Drawing Sheets

POPPET-TYPE TWO-PORT SOLENOID VALVE

TECHNICAL FIELD

The present invention relates to poppet-type two-port solenoid valves that open and close valve seats with tabular valve members in the same manner as poppet valves.

BACKGROUND ART

For example, Japanese Unexamined Patent Application Publication No. 2004-332876 discloses a two-port solenoid valve that opens and closes an elongate output orifice by using a slender tabular solenoid-operated valve member in the same manner as a poppet valve. In this solenoid valve, when an exciting coil is energized, the valve member is attracted to a fixed core and the output orifice is opened. When the energization is stopped, the valve member is separated from the fixed core by the action of fluid pressure and is pressed against a valve seat disposed around the output orifice. Thus, the output orifice is closed.

Such a solenoid valve having the above-described structure has an excellent responsiveness due to having a short stroke for opening and closing the valve member, but a further improvement in the responsiveness has been required in recent years.

Since the operating force with which the valve member opens the valve seat is electromagnetic force, the responsiveness during opening of the valve can be improved with relative ease by enhancing the electromagnetic force. However, since the operating force with which the valve member closes the valve seat is fluid pressure, the responsiveness during closing of the valve is extremely difficult to improve. The responsiveness can be improved by further shortening the stroke of the valve member, but the flow rate of the pressurized fluid is disadvantageously reduced with the stroke.

DISCLOSURE OF THE INVENTION

An object of the present invention is to provide a two-port solenoid valve, which opens and closes a valve seat by operating a tabular valve member by using electromagnetic force and fluid pressure, capable of improving the responsiveness when the valve member closes the valve seat by the action of the fluid pressure.

To achieve the above-described object, according to the present invention, a poppet-type two-port solenoid valve includes a solenoid-operation portion having an exciting coil wound around a bobbin, a fixed core accommodated inside a central hole of the bobbin, and a slender pole face extending in one direction disposed at an end of the fixed core; a main valve portion having an elongate output orifice facing the interior of a valve chamber formed between the main valve portion and the solenoid-operation portion, a valve seat enclosing the circumference of the output orifice, and an input orifice facing the circumference of the valve seat; and a movable slender tabular valve member extending in one direction and accommodated inside the valve chamber, the valve member being attracted to the pole face of the fixed core so as to open the output orifice during energization of the exciting coil and being pressed against the valve seat by the action of fluid pressure so as to close the output orifice in the same manner as a poppet valve when the energization is stopped. The solenoid valve is characterized in that the pole face of the fixed core has a fluid chamber for introducing pressurized fluid from the input orifice at a predetermined position.

According to the present invention, the fluid chamber of the fixed core is preferably disposed at the intermediate position of the pole face so as to cross the pole face.

Moreover, according to the present invention, the fluid chamber is preferably disposed at the intermediate position of the pole face in the lengthwise direction so as to cross the pole face in the widthwise direction, and concave portions for facilitating the introduction of the pressurized fluid to the fluid chamber are preferably formed at the central positions of the long sides of the valve member by increasing gaps between the valve member and the valve chamber.

Furthermore, according to the present invention, a frame-shaped contact portion enclosing the pole face of the fixed core and protruding toward the valve member farther than the pole face is preferably disposed at the end face of the bobbin, the valve member is preferably disposed at an open-end position when the valve member is attracted to the fixed core so as to be brought into contact with the contact portion, and a gap is preferably formed between the valve member and the pole face when the valve member is at the open-end position.

In a preferable structure according to the present invention, a spacer is interposed between the main valve portion and the solenoid-operation portion, and the valve chamber is sectionally formed by the spacer.

According to the present invention, the pole face of the fixed core has the fluid chamber such that the pressurized fluid flowing from the input orifice is introduced to this fluid chamber. Therefore, when the energization of the exciting coil is stopped, the valve member is immediately separated from the fixed core by the action of the pressurized fluid introduced to the fluid chamber, and pressed against the valve seat so as to rapidly close the output orifice. As a result, the responsiveness of the valve member can be improved compared with a case without the fluid chamber.

BEST MODE FOR CARRYING OUT THE INVENTION

Figure 1:
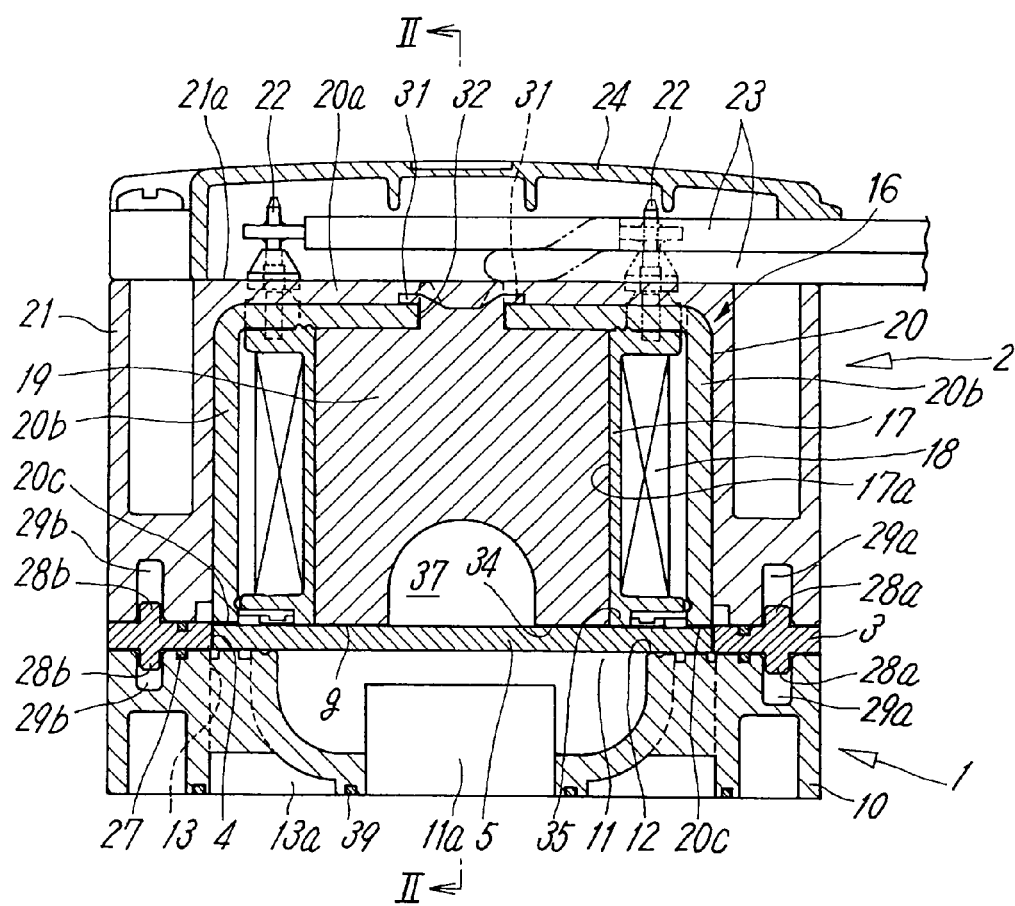
FIG. 1 is a cross-sectional view of a two-port solenoid valve according to the present invention.
Figure 2:
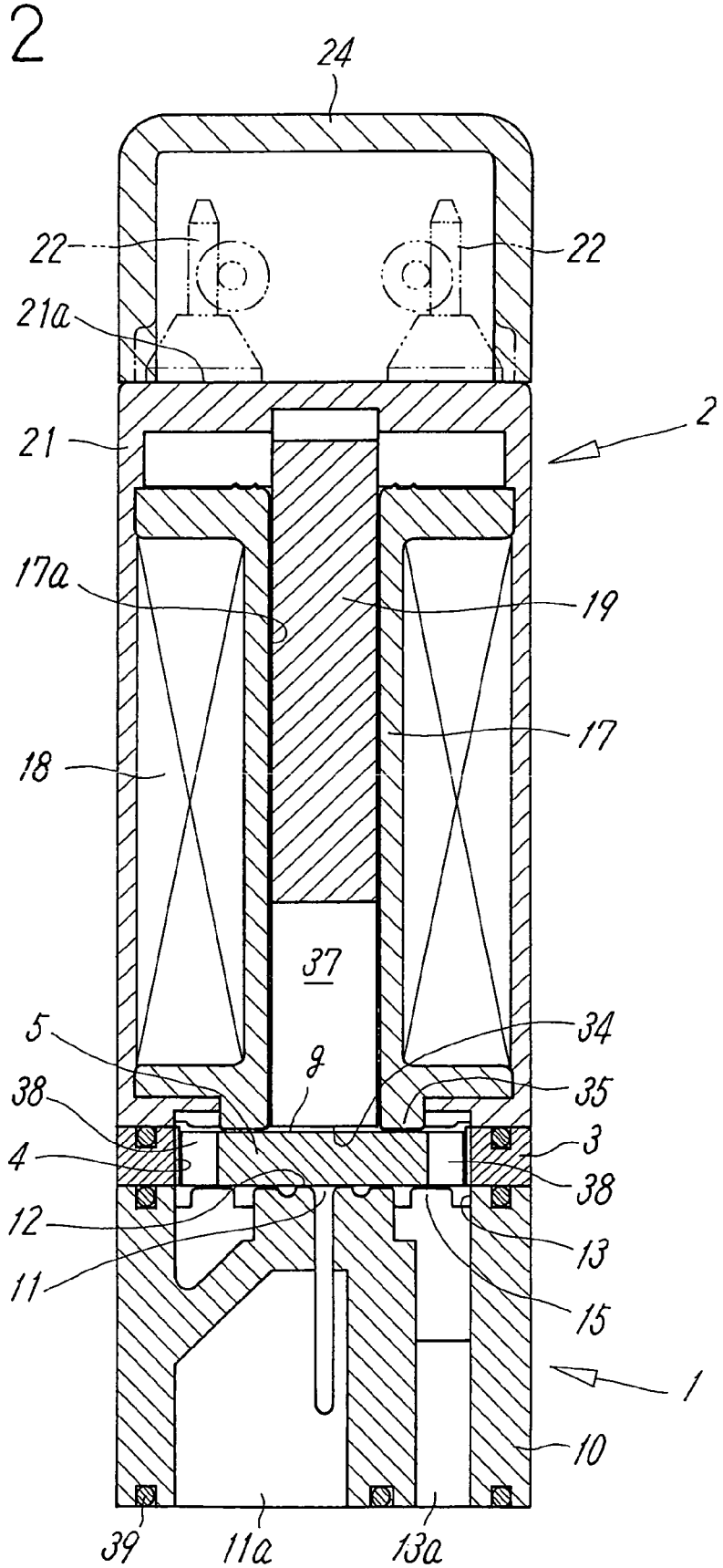
FIG. 2 is an enlarged cross-sectional view taken along line II-II in FIG. 1.
Figure 3:
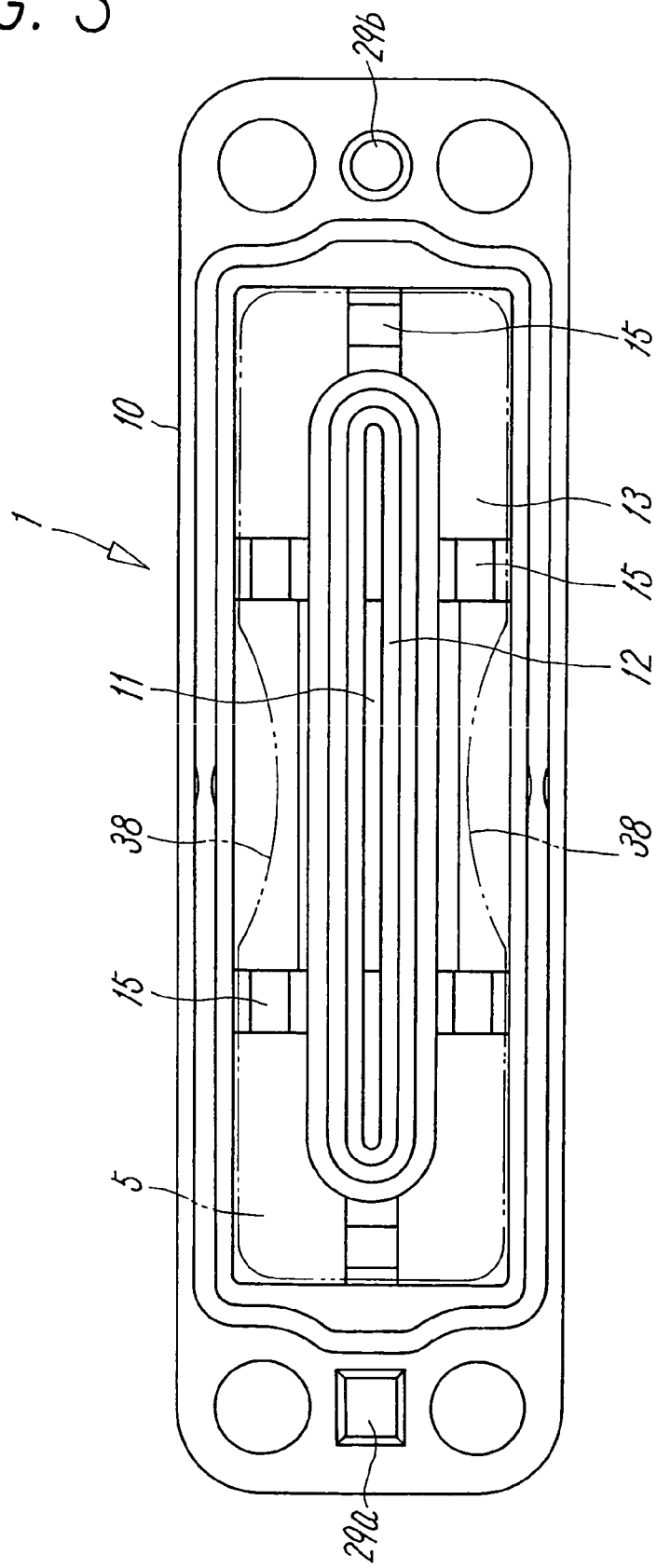
FIG. 3 is a plan view of a main valve portion 1.
Figure 4:
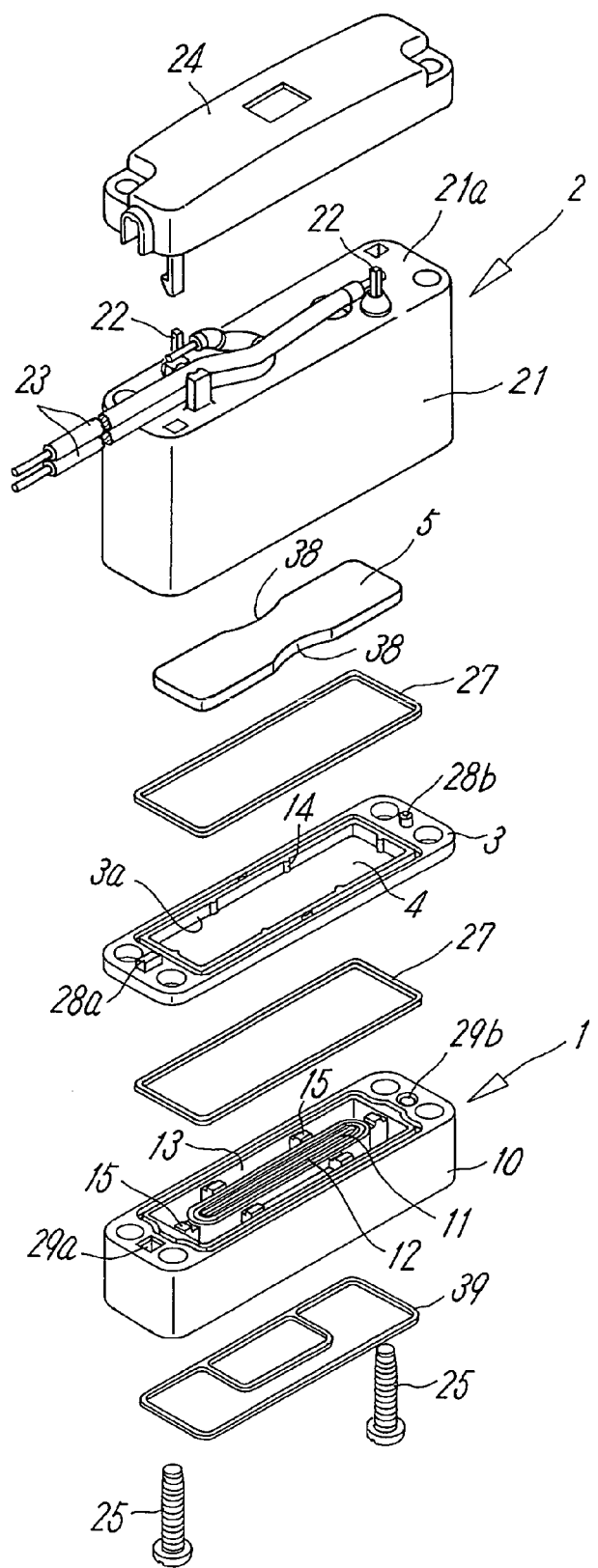
FIG. 4 is an exploded perspective view of the solenoid valve shown in FIG. 1.

FIGS. 1 to 4 illustrate a preferred embodiment of a poppet-type two-port solenoid valve according to the present invention. This solenoid valve includes a main valve portion 1 and a solenoid-operation portion 2 connected to each other having a spacer 3 interposed therebetween, and a valve member 5 accommodated inside a valve chamber 4 that is disposed between the main valve portion 1 and the solenoid-operation portion 2. The shape of the solenoid valve when viewed in plan is approximately rectangular extending in the longitudinal direction or in the lateral direction (in the lateral direction in FIG. 1).

The main valve portion 1 includes a housing 10 having an approximately rectangular shape extending in the lateral direction when viewed in plan. The housing 10 includes an elongate output orifice 11 extending in the lateral direction and facing the interior of the valve chamber 4, a valve seat 12 having an elliptical shape extending in the lateral direction and enclosing the circumference of the output orifice 11, and an input orifice 13 enclosing the circumference of the valve seat 12 and facing the interior of the valve chamber 4 disposed in the upper surface of the housing 10. Moreover, the housing 10 includes an output port 11a communicating with the output orifice 11 and an input port 13a communicating with the input orifice 13 disposed in the bottom surface of the housing 10.

The valve member 5 is an approximately rectangular plate extending in the lateral direction composed of a magnetic material such as iron, and has a substantially uniform thickness in its entirety. The valve member 5 is accommodated inside the valve chamber 4, which is the interior of a rectangular hole 3a formed in the spacer 3, so as to be vertically movable; and opens or closes the output orifice 11 by being separated from or coming into contact with the valve seat 12. The surfaces of this valve member 5, at least the lower surface that comes into contact with or is separated from the valve seat 12, are preferably coated with nickel, chromium, or the like.

The valve member 5 is separated from the valve seat 12 such that the output orifice 11 is opened by the action of the electromagnetic force generated by the solenoid-operation portion 2, and the valve member 5 comes into contact with the valve seat 12 such that the output orifice 11 is closed by the action of the fluid pressure applied to the valve member 5.

The hole 3a is slightly larger than the valve member 5 both lengthwise and widthwise, and a plurality of vertically extending guiding ribs 14 for stabilizing the movement of the valve member 5 are formed on the inner surface of the hole 3a.

Moreover, in order to prevent the valve member 5 from tilting, a plurality of protrusions 15 whose heights are slightly less than or equal to that of the valve seat 12 are formed in the housing 10 so as to enclose the valve seat 12 in the interior of the valve chamber 4, and support the edge portion of the lower surface of the valve member 5 from the bottom.

The solenoid-operation portion 2 includes an exciting coil 18 wound around a nonmagnetic bobbin 17 extending in the lateral direction when viewed in plan, a fixed core 19 accommodated inside a central hole 17a of the bobbin 17, and an approximately angular U-shaped magnetic frame 20 that covers the upper surface and both side surfaces in the lengthwise direction of the bobbin 17. The bobbin 17, the exciting coil 18, the fixed core 19, and the magnetic frame 20 form an electromagnetic assembly 16. The upper surface and all the side surfaces of this electromagnetic assembly 16 are covered with a sealing member 21 composed of synthetic resin. A pair of coil terminals 22 electrically connected to the exciting coil 18 protrude from the flat upper surface 21a of the sealing member 21, and lead wires 23 are connected to the coil terminals 22. A detachable cover 24 is disposed on the upper surface 21a of the sealing member 21 so as to cover connecting portions of the coil terminals 22 and the lead wires 23.

The spacer 3 is disposed above the upper surface of the housing 10 of the main valve portion 1 via a gasket 27 and is disposed below the lower surface of the sealing member 21 of the solenoid-operation portion 2 via another gasket 27. The main valve portion 1 and the solenoid-operation portion 2 are connected to each other with bolts 25, and the spacer 3 is retained there between. Moreover, positioning pins 28a and 28b are formed in both the upper and lower surfaces of the spacer 3 at both ends in the lengthwise direction, the shapes of the pins at one end of the spacer 3 being different from those at the other end, for example, rectangular and circular. On the other hand, positioning holes 29a and 29b into which the positioning pins 28a and 28b are fitted are formed in the housing 10 and the sealing member 21. The main valve portion 1 and the solenoid-operation portion 2 are positioned by fitting the positioning pins 28a and 28b into the positioning holes 29a and 29b, and are integrated via the spacer 3.

The spacer 3 may be integrally formed with the main valve portion 1 or the solenoid-operation portion 2.

Figure 5:
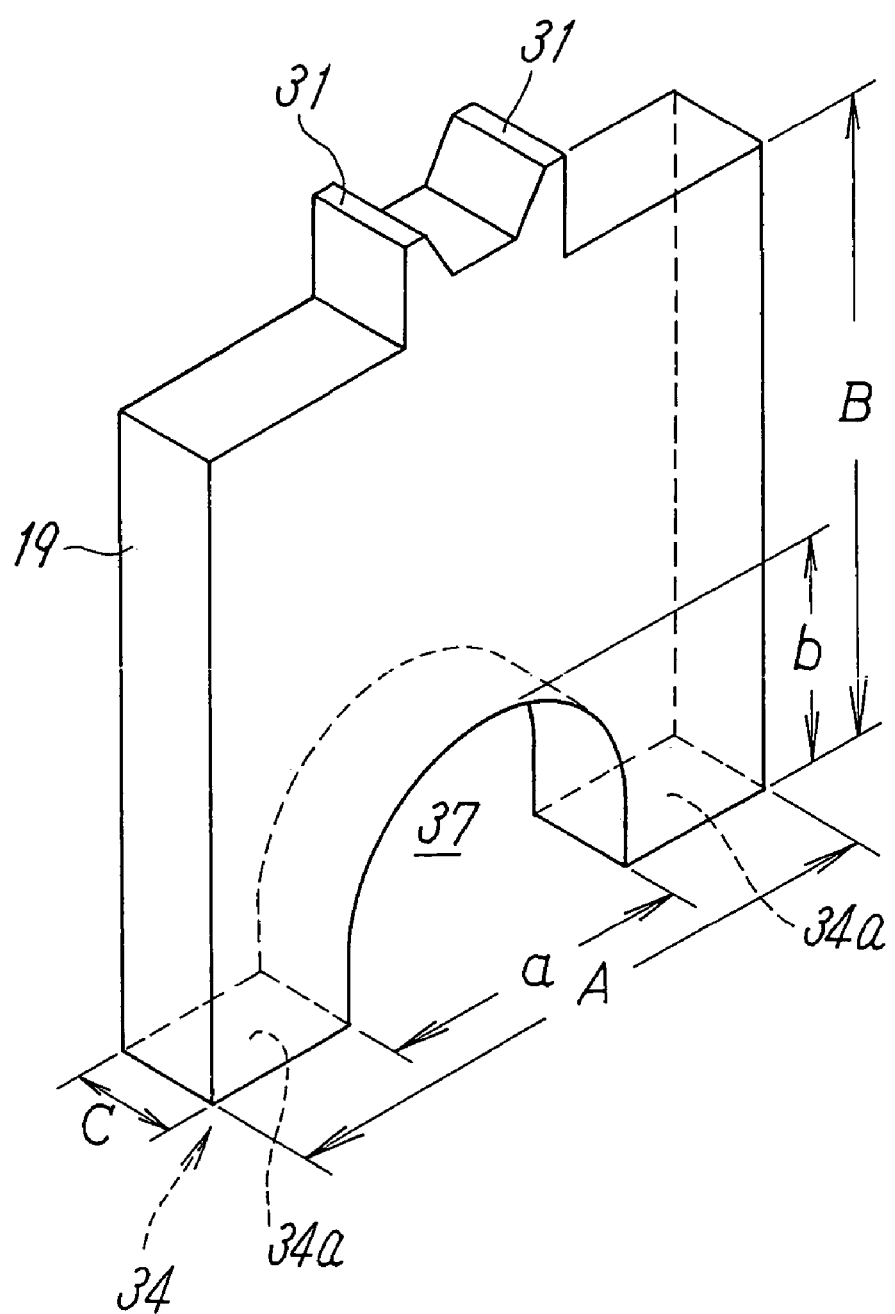
FIG. 5 is a perspective view of a fixed core.

As shown in FIG. 5, the fixed core 19 in the solenoid-operation portion 2 has a rectangular cross section extending in the lateral direction, and is accommodated inside the rectangular central hole 17a of the bobbin 17. A faying surface at the top of the fixed core 19 is in contact with the inner surface of a top plate 20a of the magnetic frame 20. A protrusion 31 formed in the center of the faying surface is fitted into a catch hole 32 of the top plate 20a, and is deformed outward so as to be retained at the outer edge of the catch hole 32. Thus, the fixed core 19 is fixed to the magnetic frame 20 while being magnetically coupled. The surface of the fixed core 19 is coated with nickel, chromium, or the like.

The end surface, i.e., the bottom surface, of the fixed core 19 functions as a rectangular pole face 34 extending in the lateral direction for magnetically attracting the valve member 5. Also, bottom surfaces 20c, 20c of side plates 20b, 20b at the left and right of the magnetic frame 20 function as pole surfaces for magnetically attracting the valve member 5. The pole face 34 of the fixed core 19 and the bottom surfaces 20c, 20c of the magnetic frame 20 are located in an identical plane, and the valve member 5 extends in the lateral direction such that each end thereof in the lengthwise direction faces a corresponding one of bottom surfaces 20c, 20c of the magnetic frame 20.

A contact portion 35 to be brought into contact with the valve member 5 having a rectangular frame shape enclosing the pole face 34 of the fixed core 19 is formed at the end face of the bobbin 17 adjacent to the valve chamber 4. This contact portion 35 protrudes toward the valve chamber 4 slightly farther than the pole face 34. When the valve member 5 is attracted to the fixed core 19, the contact portion 35 comes into contact with the valve member 5 and the valve member 5 is arrested. Thus, the position of a stroke end when the valve member 5 opens the valve seat 12 is defined. When the valve member 5 is located at the position where the valve member 5 is in contact with the contact portion 35 as described above, small gaps g are provided between the upper surface of the valve member 5 and the pole face 34 of the fixed core 19 and between the upper surface of the valve member 5 and the bottom surfaces 20c of the magnetic frame 20.

When the exciting coil 18 of the solenoid-operation portion 2 is energized, the valve member 5 is attracted so as to be separated from the valve seat 12 by the action of the magnetic force generated at the pole face 34 of the fixed core 19 and the bottom surfaces 20c of the magnetic frame 20, and thus the output orifice 11 is opened. Therefore, pressurized fluid from the input orifice 13 flows into the output orifice 11, and is output from the output port 11a to an actuator such as a cylinder. At this time, the valve member 5 is in contact with the contact portion 35 at the lower end of the bobbin 17, and is arrested at the position. Therefore, small gaps g are provided between the valve member 5 and the pole face 34 of the fixed core 19 and between the valve member 5 and the bottom surfaces 20c of the magnetic frame 20. Since the gaps g communicate with the input orifice 13, the gaps g are filled with pressurized fluid flowing from the input orifice 13.

When the energization of the exciting coil 18 is stopped in this state, the valve member 5 is pressed against the valve seat 12 by the action of the fluid pressure applied to the valve member 5, and the output orifice 11 is closed in the same manner as a poppet valve. As a result, the output of the pressurized fluid from the output port 11a is stopped.

The valve member 5 closes the valve seat 12 mainly by the action of the fluid pressure applied to a portion in the upper surface of the valve member 5 corresponding to the valve seat 12, and thus the magnitude of the operating force is substantially proportional to the opening area of the valve seat 12. Therefore, if the fluid pressure required for the closing operation is immediately applied to the portion in the upper surface of the valve member 5 corresponding to the valve seat 12 when the energization of the exciting coil 18 is stopped, the speed of response is expected to be increased.

Thus, a fluid chamber 37 for guiding the pressurized fluid from the input orifice 13 and applying the fluid pressure to the valve member 5 is formed in the pole face 34 of the fixed core 19 at a predetermined position. This fluid chamber 37 is a groove-shaped notch crossing the fixed core 19 in the widthwise direction, and is open to both side surfaces of the fixed core 19. The opening is covered with the wall of the central hole 17a of the bobbin 17.

Such a fluid chamber 37 formed in the pole face 34 of the fixed core 19 can increase the volume of the gaps g between the pole face 34 and the valve member 5 such that the valve member 5 can be immediately separated from the fixed core 19 and can be brought into contact with the valve seat 12 by the action of the fluid pressure guided to the fluid chamber 37 when the energization of the exciting coil 18 is stopped. Thus, the responsiveness is markedly improved.

The position of the fluid chamber 37 can be anywhere as long as the volume of the gaps g between the fixed core 19 and the valve member 5 can be increased, but preferably at the intermediate position of the fixed core 19 in the lengthwise direction as shown in the drawings. Moreover, the size of the fluid chamber 37 is preferably defined such that the reduction in magnetic attraction generated by the fixed core 19 is minimized, for example, in FIG. 5, a chamber length a of the fluid chamber 37 is preferably in a range approximately from a quarter to a half of a core length A, and a chamber depth b is preferably in a range approximately from a core thickness C to twice the core thickness C.

The fluid chamber 37 is arc-shaped or U-shaped in the drawings, but may have any shape such as a V shape or an angular V shape.

The fluid chamber 37 disposed at the above-described position and having the above-described size separates the pole face 34 into two pole-face sections 34a (FIG. 5). These pole-face sections 34a are symmetrically disposed having the fluid chamber 37 therebetween, and have an identical shape and an identical size. Therefore, the pole-face sections 34a can uniformly attract the valve member 5 with equal electromagnetic force.

On the other hand, when the valve member 5 closes the valve seat 12 by the action of the pressurized fluid, the operating force applied by the pressurized fluid inside the fluid chamber 37 can be efficiently applied to the back center of the valve member 5 at the position corresponding to the valve seat 12 since the fluid chamber 37 is located approximately in the center of the valve member 5. Thus, the valve member 5 can be stably operated while maintaining the balance thereof.

The pressurized fluid is introduced from the input orifice 13 to the fluid chamber 37 through a gap between the outer periphery of the valve member 5 and the inner wall of the valve chamber 4. In order to facilitate the introduction, arc-shaped concave portions 38 are formed at the central positions of the long sides of the valve member 5. The gap between the outer periphery of the valve member 5 and the inner wall of the valve chamber 4 is increased at the positions of these concave portions 38. As clearly shown in FIG. 2, the width of the valve member 5 at the concave portions 38 is equal to or slightly larger than the frame width of the rectangular frame-shaped contact portion 35 in the widthwise direction. Therefore, the fluid chamber 37 and the input orifice 13 do not communicate directly with each other via the concave portions 38, but communicate with each other via the gap between the contact portion 35 and the upper surface of the valve member 5.

The contact portion 35 may have a groove that increases the gap between the contact portion 35 and the upper surface of the valve member 5 so as to facilitate the introduction of the pressurized fluid at least at positions corresponding to the concave portions 38.

A gasket 39 shown in the drawings is attached to the bottom surface of the housing 10 of the main valve portion 1. The gasket 39 is interposed between this solenoid valve and a fluid-pressure device such as a manifold when this solenoid valve is attached to the fluid-pressure device.

Figure 6:
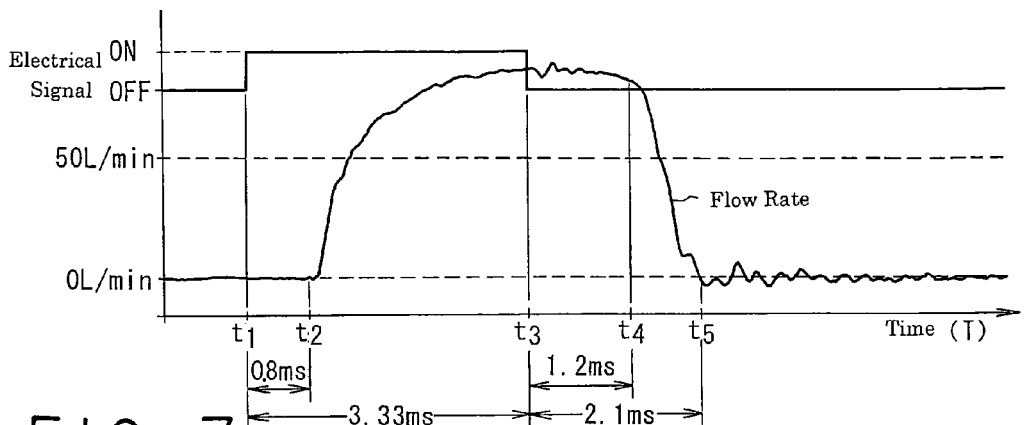
FIG. 6 is a diagram illustrating experimental data about the responsiveness when a fluid chamber is formed in the fixed core.
Figure 7:
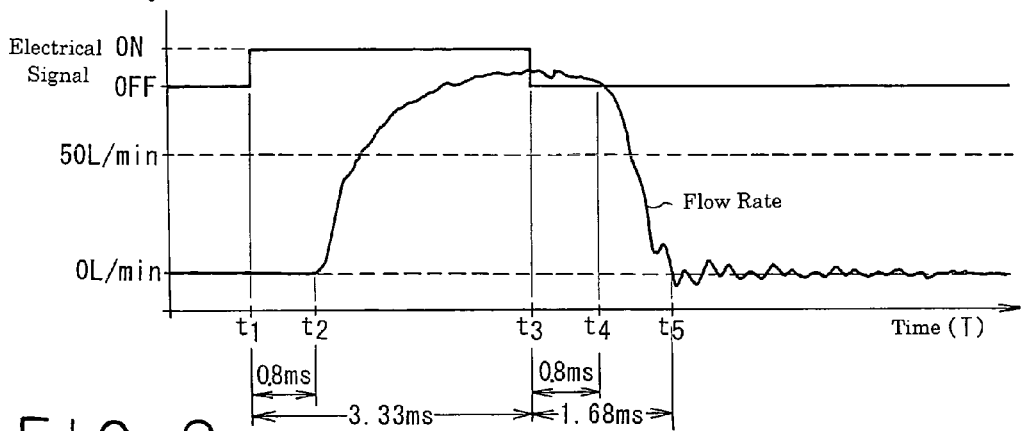
FIG. 7 is a diagram illustrating experimental data about the responsiveness when a fluid chamber whose size is different from that of the case shown in FIG. 6 is formed in the fixed core.
Figure 8:
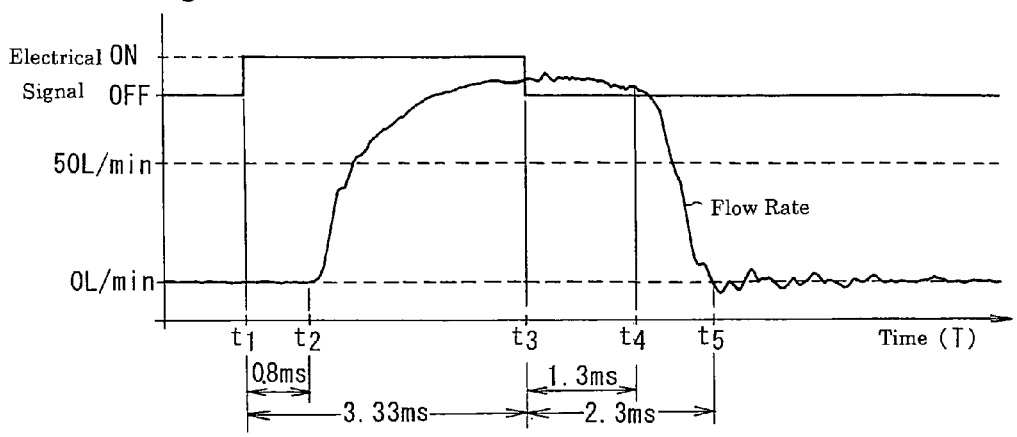
FIG. 8 is a diagram illustrating comparative experimental data about the responsiveness when no fluid chamber is formed in the fixed core.

FIGS. 6 to 8 illustrate experimental results of the responsiveness of the valve member 5 with or without the fluid chamber 37 in the fixed core 19. The data shown in FIGS. 6 and 7 were obtained when arc-shaped and U-shaped fluid chambers, respectively, having different sizes were formed, and the data shown in FIG. 8 was obtained when no fluid chamber was formed.

The solenoid valves used in these experiments had the same structure except for the formation of the fluid chamber 37 in the fixed core 19. Moreover, in the solenoid valves used in these experiments, the fixed core 19 had the same basic dimensions, and the core length A, the core height B, and the core thickness C shown in FIG. 5 were 14 mm, 14.3 mm, and 2.3 mm, respectively.

The fluid chamber in the fixed core used in the experiment shown in FIG. 6 was arc-shaped, and the chamber length a, the chamber depth b, and the radius of curvature of the arc were 7 mm, 2.5 mm, and 3.5 mm, respectively. The fluid chamber used in the experiment shown in FIG. 7 was U-shaped, and the chamber length a, the chamber depth b, and the radius of curvature of the arc were 7 mm, 5 mm, and 3.5 mm, respectively.

With reference to FIGS. 6 to 8, when an electrical signal was turned on and the exciting coil 18 was energized at time $t_1$, the valve member 5 was separated from the valve seat 12 and the output orifice 11 was opened. With this, the flow rate of the fluid flowing out of the output port 11a started increasing at time $t_2$, and reached the maximum flow rate (approximately 70 ml/min) when the valve seat 12 was fully opened. Subsequently, when the electrical signal was turned off at time $t_3$, the valve member 5 approached the valve seat 12 and closed the output orifice 11. With this, the flow rate of the fluid flowing out of the output port 11a started decreasing at time $t_4$, and was reduced to approximately zero when the valve seat 12 was completely closed at time $t_5$.

When durations from when the electrical signal was turned off to when the flow rate of the fluid flowing out of the output port 11a started decreasing ($t_4$-$t_3$) were compared, the durations in the cases with the fluid chambers shown in FIGS. 6 and 7 (1.2 ms and 0.8 ms, respectively) were shorter than that in the case without the fluid chamber shown in FIG. 8 (1.3 ms).

Also, when durations from when the electrical signal was turned off to when the flow rate of the fluid flowing out of the output port 11a was reduced to zero ($t_5$-$t_3$) were compared, the durations in the cases with the fluid chambers shown in FIGS. 6 and 7 (2.1 ms and 1.68 ms, respectively) were shorter than that in the case without the fluid chamber shown in FIG. 8 (2.3 ms).

These experimental results have corroborated that the responsiveness when the valve member 5 closes the valve seat 12 can be improved by forming the fluid chamber 37 in the pole face 34 of the fixed core 19 compared with the case without the fluid chamber.

The invention claimed is:

1. A two-port solenoid valve comprising:
    a solenoid-operation portion including an exciting coil wound around a bobbin, a fixed core accommodated inside a central hole of the bobbin, a cross-sectional shape of the fixed core being a rectangle extending in one direction, and a rectangular pole face provided at an end portion of the fixed core;
    a main valve portion including an elongate output orifice facing the interior of a valve chamber formed between the main valve portion and the solenoid-operation portion, a valve seat enclosing the circumference of the output orifice, and an input orifice facing the circumference of the valve seat; and
    a movable slender tabular valve member extending in one direction and accommodated inside the valve chamber, the valve member being attracted to the pole face of the fixed core so as to open the output orifice during energization of the exciting coil and being pressed against the valve seat by action of fluid pressure so as to close the output orifice when the energization is stopped, wherein
    a fluid chamber is formed for introducing pressurized fluid from the input orifice and being operated to apply the pressurized fluid to the valve member at a central position of a longer direction in the end portion of the fixed core, so as to divide the pole face into two by crossing the end portion in a shorter direction.

2. The two-port solenoid valve according to claim 1, wherein a gap between the valve member and the valve chamber can be increased and concave portions for facilitating introduction of the pressurized fluid to the fluid chamber are disposed at the central positions of longer sides of the valve member.

3. The two-port solenoid valve according to claim 1, wherein a frame-shaped contact portion enclosing the pole face of the fixed core and protruding toward the valve member farther than the pole face is disposed at the end face of the bobbin; the valve member is disposed at an open-end position when the valve member is attracted to the fixed core so as to be brought into contact with the contact portion; and a gap is formed between the valve member and the pole face when the valve member is at the open-end position.

4. The two-port solenoid valve according to claim 1, wherein a spacer is interposed between the main valve portion and the solenoid-operation portion; and the valve chamber is sectionally formed by the spacer.

5. The two-port solenoid valve according to claim 3, wherein a spacer is interposed between the main valve portion and the solenoid-operation portion; and the valve chamber is sectionally formed by the spacer.

6. The two-port solenoid valve according to claim 2, wherein a frame-shaped contact portion enclosing the pole face of the fixed core and protruding toward the valve member farther than the pole face is disposed at the end face of the bobbin; the valve member is disposed at an open-end position when the valve member is attracted to the fixed core so as to be brought into contact with the contact portion; and a gap is formed between the valve member and the pole face when the valve member is at the open-end position.

7. The two-port solenoid valve according to claim 2, wherein a spacer is interposed between the main valve portion and the solenoid-operation portion; and the valve chamber is sectionally formed by the spacer.

8. The two-port solenoid valve according to claim 6, wherein a spacer is interposed between the main valve portion and the solenoid-operation portion; and the valve chamber is sectionally formed by the spacer.

* * * * *